(12) United States Patent
Oh

(10) Patent No.: US 9,140,837 B2
(45) Date of Patent: Sep. 22, 2015

(54) OPTICAL MEMBER AND DISPLAY DEVICE INCLUDING THE SAME

(75) Inventor: Jeong Taek Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/111,421

(22) PCT Filed: Nov. 30, 2011

(86) PCT No.: PCT/KR2011/009235
§ 371 (c)(1),
(2), (4) Date: Oct. 11, 2013

(87) PCT Pub. No.: WO2012/141401
PCT Pub. Date: Oct. 18, 2012

(65) Prior Publication Data
US 2014/0029239 A1    Jan. 30, 2014

(30) Foreign Application Priority Data

Apr. 13, 2011 (KR) ........................ 10-2011-0034472

(51) Int. Cl.
| | |
|---|---|
| *F21V 9/16* | (2006.01) |
| *G02B 5/22* | (2006.01) |
| *G02B 5/02* | (2006.01) |
| *G02F 1/1335* | (2006.01) |
| *F21V 9/00* | (2015.01) |

(52) U.S. Cl.
CPC ... *G02B 5/22* (2013.01); *F21V 9/00* (2013.01); *G02B 5/0242* (2013.01); *G02B 5/0278* (2013.01); *G02F 1/133617* (2013.01); *G02F 2201/503* (2013.01); *G02F 2202/36* (2013.01)

(58) Field of Classification Search
CPC ...... G02B 5/22; G02B 5/0242; G02B 5/0278; G02F 1/133617; G02F 2201/503; G02F 2202/36; F21V 9/00
See application file for complete search history.

(56) References Cited

U.S. PATENT DOCUMENTS

| | | | | |
|---|---|---|---|---|
| 7,293,907 | B2 * | 11/2007 | Kim et al. | 362/612 |
| 8,558,446 | B2 * | 10/2013 | Miki et al. | 313/502 |
| 2006/0097245 | A1 * | 5/2006 | Aanegola et al. | 257/26 |
| 2006/0114371 | A1 * | 6/2006 | Peterson et al. | 349/61 |
| 2011/0109847 | A1 * | 5/2011 | Nagase et al. | 349/96 |
| 2011/0180832 | A1 * | 7/2011 | Kim | 257/98 |

FOREIGN PATENT DOCUMENTS

| | | |
|---|---|---|
| JP | 2006-10748 A | 1/2006 |
| KR | 10-2008-0057656 A | 6/2008 |
| KR | 10-2008-0063986 A | 7/2008 |

\* cited by examiner

*Primary Examiner* — Donald Raleigh
(74) *Attorney, Agent, or Firm* — Birch, Stewart, Kolasch & Birch, LLP

(57) ABSTRACT

Disclosed are an optical member and a display device including the same. The optical member includes a wavelength conversion layer to convert a wavelength of an incident light, and an impact absorbing layer on the wavelength conversion layer.

16 Claims, 3 Drawing Sheets

OPTICAL MEMBER AND DISPLAY DEVICE INCLUDING THE SAME

TECHNICAL FIELD

The embodiment relates to an optical member and a device including the same.

BACKGROUND ART

The embodiment relates to an optical member and a display device including the same.

Recently, flat display devices, such as an LCD (liquid crystal display), a PDP (plasma display panel) and an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been mainly developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness greater than thickness of the edge-illumination type backlight unit in order to ensure brightness uniformity.

In order to solve the above problem, a quantum dot bar having a plurality of quantum dots, which can convert blue light into red light or green light when receiving the blue light, is positioned in front of a blue LED that emits the blue light. Thus, as the blue light is irradiated onto the quantum dot bar, the blue light, the red light and the green light are mixed to each other by the quantum dots distributed in the quantum dot bar and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED, which emits blue light, to supply signals and power to the LEDs and a bonding member formed under the bottom surface of the FPCB.

The display device capable of displaying various images using the white light supplied to the light guide plate through the quantum dot bar as the blue light is emitted from the blue LED has been extensively used.

DISCLOSURE OF INVENTION

Technical Problem

The embodiment provides an optical member having an improved optical characteristic and a display device including the same.

Solution to Problem

An optical member according to one embodiment includes a wavelength conversion layer to convert a wavelength of an incident light; and an impact absorbing layer on the wavelength conversion layer.

A display device according to one embodiment includes a light source; a plurality of first optical sheets onto which a light emitted from the light source is incident; a second optical sheet on the first optical sheet; and a display panel provided on the second optical sheet, wherein the second optical sheet comprises: a wavelength conversion layer to convert a wavelength of the light emitted from the light source; and a first impact absorbing layer on the wavelength conversion layer.

A display device according to one embodiment includes a light source; a wavelength conversion member to convert a wavelength of light emitted from the light source; and a display panel on the wavelength conversion member, wherein the wavelength conversion member comprises: a wavelength conversion layer including a plurality of wavelength conversion particles; and an impact absorbing layer on the wavelength conversion layer.

Advantageous Effects of Invention

The embodiment provides an optical member, which can be easily manufactured and prevent image quality from being degraded due to damage, and a display device including the same.

According to the embodiment, an optical member includes a wavelength conversion layer to convert a wavelength of an incident light, and an impact absorbing layer on the wavelength conversion layer.

According to the embodiment, a display device includes a light source, a plurality of first optical sheets onto which a light emitted from the light source is incident, a second optical sheet on the first optical sheet, and a display panel provided on the second optical sheet. The second optical sheet includes a wavelength conversion layer to convert a wavelength of the light emitted from the light source, and a first impact absorbing layer on the wavelength conversion layer.

According to the embodiment, a display device includes a light source, a wavelength conversion member to convert a wavelength of light emitted from the light source, and a display panel on the wavelength conversion member. The wavelength conversion member includes a wavelength conversion layer including a plurality of wavelength conversion particles, and an impact absorbing layer on the wavelength conversion layer.

As described above, the optical member according to the embodiment includes an impact absorbing layer. Accordingly, the optical member according to the embodiment can be effectively protected from external impact such as scratches.

In particular, if the impact absorbing layer includes acryl resin or urethane resin, the impact absorbing layer represents high scratch resistance, and may have a self-recovery function against the scratches.

In addition, the optical member according to the embodiment includes the wave conversion layer, and the wavelength of the incident light can be changed.

Therefore, the optical member according to the embodiment changes the wavelength of the light emitted from the light source while protecting other optical sheets. Accordingly, the display device according to the embodiment can be easily manufactured at the less cost, and can be realized in a slimness structure.

In addition, the optical member according to the embodiment may be interposed between other optical sheets or adjacent to other optical sheets. Since the optical member according to the embodiment includes the impact absorbing layer, the optical member is not damaged due to the adjacent optical sheets. In addition, the optical member does not damage adjacent other optical sheets.

Therefore, in the display device according to the embodiment, image degradation can be prevented due to the damage.

MODE FOR THE INVENTION

Figure 1:
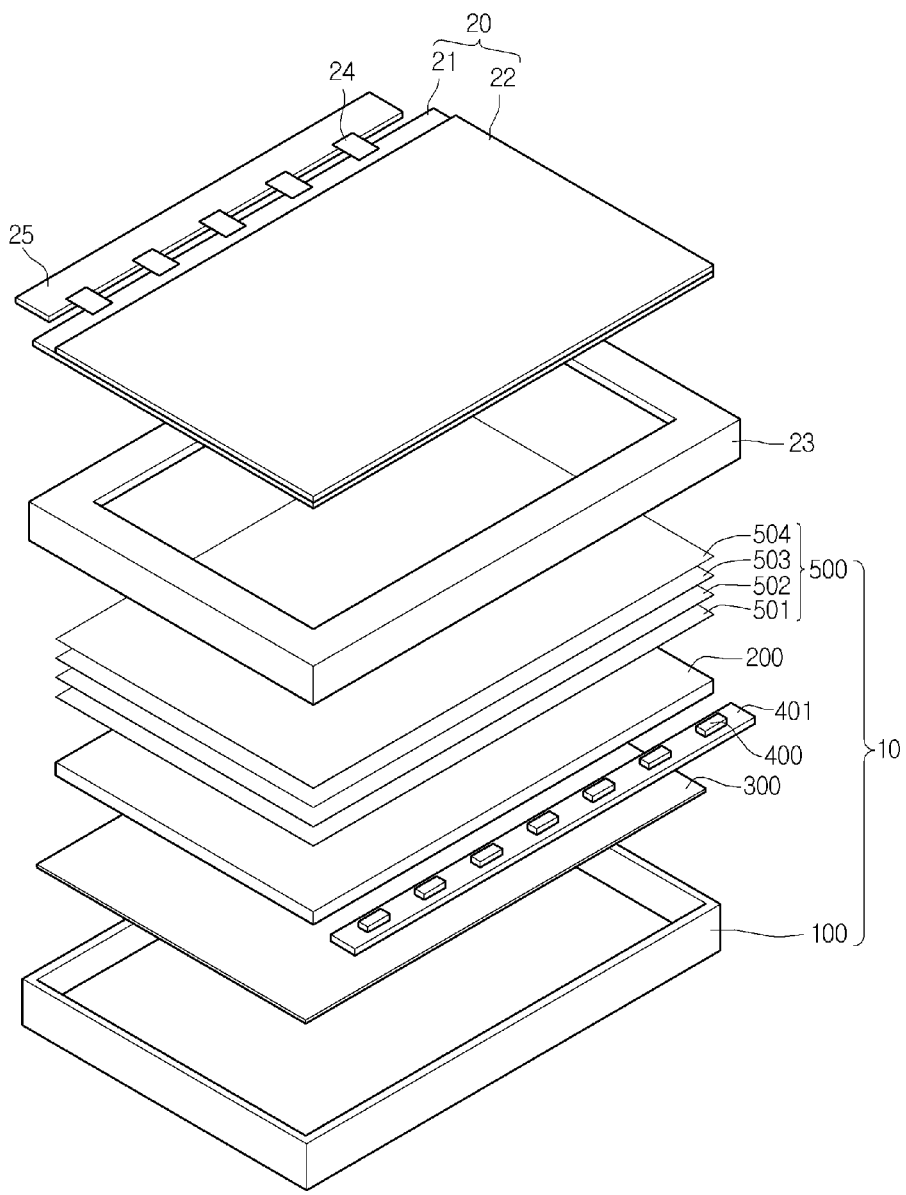
FIG. 1 is an exploded perspective view showing a liquid crystal display according to the embodiment.

In the description of the embodiments, it will be understood that when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
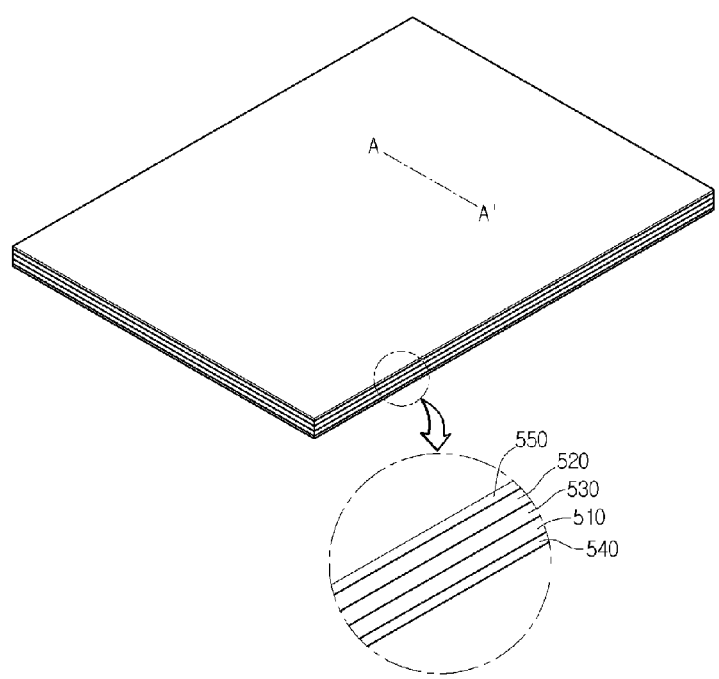
FIG. 2 is a perspective view showing a wavelength conversion sheet.
Figure 3:
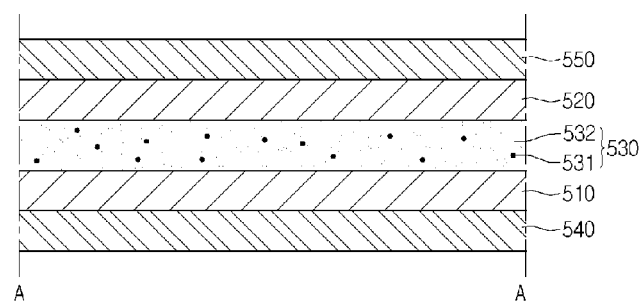
FIG. 3 is a sectional view taken along line A-A' of FIG. 2.
Figure 4:
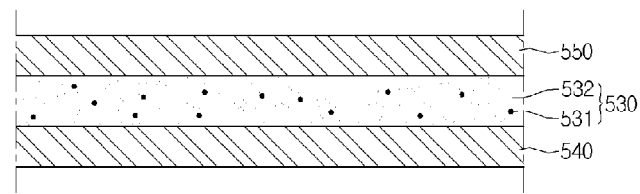
FIGS. 4 and 5 are sectional views showing various modifications of the wavelength conversion sheet.
Figure 5:
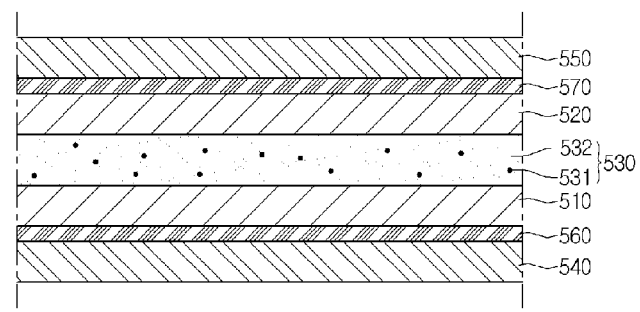
Figure 6:
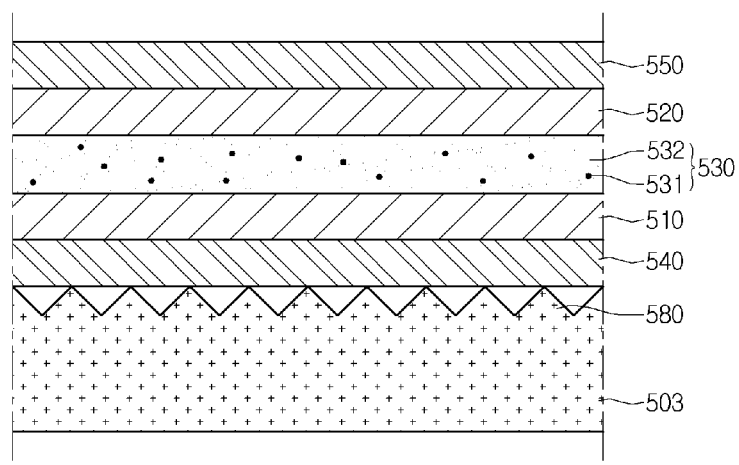
FIG. 6 is a view showing a second prism sheet and the wavelength conversion sheet.
Figure 7:
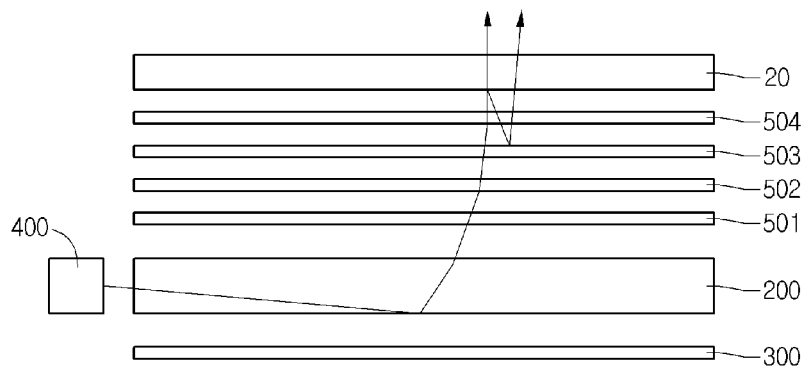
FIG. 7 is a view showing a procedure in which the wavelength of incident light is changed by the wavelength conversion sheet.

FIG. 1 is an exploded perspective view showing an LCD (liquid crystal display) according to a first embodiment, and FIG. 2 is a perspective view showing a wavelength conversion sheet. FIG. 3 is a sectional view taken along line A-A'. FIGS. 4 and 5 are sectional views showing various deformations of the wavelength conversion sheet. FIG. 6 is a sectional view showing a second prism sheet and a wavelength conversion sheet. FIG. 7 is a view showing a procedure of converting the wavelength of incident light by the wavelength conversion sheet.

Referring to FIGS. 1 to 7, the LCD according to the embodiment includes a backlight unit 10 and a liquid crystal panel 20.

The backlight unit 10 supplies light to the liquid crystal panel 20. The backlight unit 10 serves as a surface light source so that the light can be uniformly supplied to a bottom surface of the liquid crystal panel 20.

The backlight unit 10 is disposed below the liquid crystal panel 20. The backlight unit 10 includes a bottom cover 100, a light guide plate 200, a reflective sheet 300, a plurality of light emitting diodes 400, a printed circuit board 401, and a plurality of optical sheets 500.

The upper portion of the bottom cover 100 is open. The bottom cover 100 receives the light guide plate 200, the light emitting diodes 400, the printed circuit board 401, the reflective sheet 300, and the optical sheets 500 therein.

The light guide plate 200 is disposed in the bottom cover 100 and arranged on the reflective sheet 300. The light guide plate 200 guides the light upward by totally-reflecting, refracting and scattering the light incident thereto from the light emitting diodes 400.

The reflective sheet 300 is disposed below the light guide plate 200. In more detail, the reflective sheet 300 is disposed between the light guide plate 200 and the bottom surface of the bottom cover 100. The reflective sheet 300 reflects the light upward as the light is output downward from the bottom surface of the light guide plate 200.

The light emitting diodes 400 serve as a light source for generating the light. The light emitting diodes 400 are disposed at one lateral side of the light guide plate 200. The light generated from the light emitting diodes 400 is incident into the light guide plate 200 through the lateral side of the light guide plate 200.

The light emitting diodes 400 may include a blue light emitting diode generating the blue light or a UV light emitting diode generating the UV light. In detail, the light emitting diodes 400 may emit the blue light having the wavelength band of about 430 nm to 470 nm or the UV light having the wavelength band of about 300 nm to 400 nm.

The light emitting diodes 400 are mounted on the printed circuit board 401. The light emitting diodes 400 may be disposed under the printed circuit board 401. The light emitting diodes 400 are driven by receiving a driving signal through the printed circuit board 401.

The printed circuit board 401 is electrically connected to the light emitting diodes 400. The printed circuit board 401 may mount the light emitting diodes 400 thereon. The printed circuit board 401 is disposed in the bottom cover 100.

The optical sheets 500 are disposed on the light guide plate 200. The optical sheets 500 supplies the light to the liquid crystal panel 20 by changing or enhancing the optical property of the light output from the top surface of the light guide plate 200.

The optical sheets 500 may include a diffusion sheet 501, a first prism sheet 502, a second prism sheet 503, and a wavelength conversion sheet 504.

The diffusion sheet 501 is provided above the light guide plate 200. The diffusion sheet 501 improves the uniformity of the passing light. The diffusion sheet 501 may include a plurality of beads.

The first prism sheet 502 is provided on the diffusion sheet 501. The second prism sheet 503 is provided on the first prism sheet 502. The first prism sheet 502 and the second prism sheet 503 increase the linearity of light passing through the first prism sheet 502 and the second prism sheet 503.

The wavelength conversion sheet 504 is provided on the second prism sheet 503. In more detail, the wavelength conversion sheet 504 may be interposed between the liquid crystal panel 20 and the second prism sheet 503. The wavelength conversion sheet 504 converts the wavelength of the incident light so that the incident light can be output upward.

For instance, if the light emitting diodes 400 are blue light emitting diodes, the wavelength conversion sheet 504 converts the blue light output upward from the light guide plate 200 into the green light and the red light. In detail, the wavelength conversion sheet 504 converts a part of the blue light into the green light having the wavelength in the range of about 520 nm to about 560 nm, and a part of the blue light into the red light having the wavelength in the range of about 630 nm to about 660 nm.

In addition, if the light emitting diodes 400 are UV light emitting diodes, the wavelength conversion sheet 504 converts the UV light output from the top surface of the light guide plate 200 into the blue light, the green light and the red light. In detail, the wavelength conversion sheet 504 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion sheet 504 without being converted and the lights converted by the wavelength conversion sheet 504. In detail, the white light can be incident into the liquid crystal panel 20 through the combination of the blue light, the green light and the red right. In other words, the wavelength conversion sheet 504 is an optical member to change or improve the characteristic of the incident light.

Referring to FIGS. 2 and 3, the wavelength conversion diffusion sheet 504 includes a lower substrate 510, an upper substrate 520, a wavelength conversion layer 530, a lower impact absorbing layer 540, and an upper impact absorbing layer 550.

The lower substrate 510 is provided under the wavelength conversion layer 530. The lower substrate 510 may be transparent and flexible. The lower substrate 510 may adhere to a bottom surface of the wavelength conversion layer 530.

The lower substrate 510 may include a transparent polymer such as polyethyleneterephthalate (PET).

The upper substrate 520 is disposed on the wavelength conversion layer 530. The upper substrate 520 may be transparent and flexible. The upper substrate 520 may adhere to the top surface of the wavelength conversion layer 530.

The upper substrate 520 may include a transparent polymer such as PET.

The wavelength conversion layer 530 is sandwiched between the upper and lower substrates 520 and 510. The upper and lower substrates 520 and 510 support the wavelength conversion layer 530. The upper and lower substrates 520 and 510 protect the wavelength conversion layer 530 from external physical impact.

In addition, the upper and lower substrates 520 and 510 have low oxygen transmission rate and low moisture permeability. Thus, the upper and lower substrates 520 and 510 can protect the wavelength conversion layer 530 from external chemical penetration, such as oxygen and/or moisture.

The wavelength conversion layer 530 is interposed between the lower and upper substrates 510 and 520. The wavelength conversion layer 530 may adhere to the top surface of the lower substrate 510, and adhere to the bottom surface of the upper substrate 520.

The wavelength conversion layer 530 includes a plurality of wavelength conversion particles 531 and a host layer 532.

The wavelength conversion particles 531 are interposed between the lower and upper substrates 510 and 520. In more detail, the wavelength conversion particles 531 are uniformly distributed into the host layer 532, and the host layer 532 is interposed between the lower substrate 510 and the upper substrate 520.

The wavelength conversion particles 531 convert the wavelength of the light emitted from the light emitting diodes 400. In detail, the wavelength conversion particles 531 receive light emitted from the light emitting diodes 400 to convert the wavelength of the incident light. For instance, the wavelength conversion particles 531 may convert the blue light emitted from the light emitting diodes 400 into the green light and the red light. That is, a part of the wavelength conversion particles 531 may convert the blue light into the green light having the wavelength in the range of about 520 nm to about 560 nm and a part of the wavelength conversion particles 531 may convert the blue light into the red light having the wavelength in the range of about 630 nm to about 660 nm.

In addition, the wavelength conversion particles 531 may convert the UV light emitted from the light emitting diodes 400 into the blue light, the green light and the red light. That is, a part of the wavelength conversion particles 531 may convert the UV light into the blue light having the wavelength in the range of about 430 nm to about 470 nm, and a part of the wavelength conversion particles 531 may convert the UV light into the green light having the wavelength in the range of about 520 nm to about 560 nm. Further, a part of the wavelength conversion particles 531 converts the UV light into the red light having the wavelength in the range of about 630 nm to about 660 nm.

In other words, if the light emitting diodes 400 are blue light emitting diodes that emit the blue light, the wavelength conversion particles 531 capable of converting the blue light into the green light and the red light may be employed. In addition, if the light emitting diodes 400 are UV light emitting diodes that emit the UV light, the wavelength conversion particles 531 capable of converting the UV light into the blue light, the green light and the red light may be employed.

The wavelength conversion particles 531 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals may be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle is reduced, so that the fluorescent light having the wavelength band of visible ray can be generated by adjusting the size of the particles. In addition, the quantum dot represents the extinction coefficient which is 100 to 1000 times higher than that of the general fluorescent pigment and has the superior quantum yield as compared with the general fluorescent pigment, so that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The host layer 532 surrounds the wavelength conversion particles 531. In other words, the host layer 532 contains the wavelength conversion particles 531 uniformly distributed therein. The host layer 532 may include polymer. The host layer 532 is transparent. In other words, the host layer 532 may include transparent polymer.

The host layer 532 is interposed between the upper and lower substrates 520 and 510. The host layer 532 may adhere to the top surface of the lower substrate 510 and the bottom surface of the upper substrate 520.

The lower impact absorbing layer 540 is provided below the wavelength conversion layer 530. In more detail, the lower impact absorbing layer 540 may be disposed below the lower substrate 510. In more detail, the lower impact absorbing layer 540 may be coated on the bottom surface of the lower substrate 510.

The lower impact absorbing layer 540 may have elasticity. The lower impact absorbing layer 540 may have an elasticity coefficient of about 5.8N/cm² to about 6.6N/cm². In addition, the lower impact absorbing layer 540 may have a thickness of about 100 μm to about 500 μm.

When the lower impact absorbing layer 540 has an elasticity coefficient of about 5.8N/cm² to about 6.6N/cm², the lower impact absorbing layer 540 can be effectively absorb the impact caused by the load of the wavelength conversion sheet 501. In other words, when the lower impact absorbing layer 540 has the above elasticity coefficient, the lower impact absorbing layer 540 absorbs the load of the wavelength conversion sheet 504 so that the lower impact absorbing layer 540 may be properly deformed.

The lower impact absorbing layer 540 may perform a self-recovery function. Even if a part of the lower impact absorbing layer 540 is pressed due to the external physical impact, the outer appearance of the lower impact absorbing layer 540 may be recovered to the original state thereof.

Therefore, the lower impact absorbing layer 540 can represent high scratch resistance. In addition, the lower impact absorbing layer 540 may include acryl resin or urethane resin.

In addition, the lower impact absorbing layer 540 may have a refractive index lower than that of the lower substrate 510. In other words, the lower impact absorbing layer 540 optically performs a buffering function between the air layer and the lower substrate 510, reduces reflection, and improves the incidence rate of the light into the lower substrate 510.

In order to form the lower impact absorbing layer 540, acryl resin composition and/or urethane resin composition are coated on the bottom surface of the lower substrate 510. In this case, in order to coat the resin composition, a spray coating scheme, a dip coating scheme, a spin coating scheme, a slot coating scheme, a slit coating scheme, a bar coating scheme, a roll-to-roll coating scheme can be applied. Thereafter, the coated resin composition is cured by UV light and/or heat, so that the lower impact absorbing layer 540 can be formed.

The upper impact absorbing layer 550 is provided on the wavelength conversion layer 530. In more detail, the upper impact absorbing layer 550 may be provided on the upper substrate 520. In more detail, the upper impact absorbing layer 550 may be coated on the top surface of the upper substrate 520.

The upper impact absorbing layer 550 may have elasticity. The upper impact absorbing layer 550 may have an elasticity coefficient of about 5.8N/cm³ to about 6.6N/cm². In addition, the upper impact absorbing layer 550 may have a thickness of about 100 μm to about 500 μm.

When the upper impact absorbing layer 550 has an elasticity coefficient of about 5.8N/cm² to about 6.6N/cm², the upper impact absorbing layer 550 can be effectively absorb the impact caused by the load of the liquid crystal panel 20. In other words, when the upper impact absorbing layer 550 has the above elasticity coefficient, the upper impact absorbing layer 550 absorbs the load of the liquid crystal panel 20 so that the upper impact absorbing layer 550 may be properly deformed.

The upper impact absorbing layer 550 may perform a self-recovery function. Even if a part of the upper impact absorbing layer 550 is pressed due to the external physical impact, the outer appearance of the upper impact absorbing layer 550 may be recovered to the original state thereof.

Therefore, the upper impact absorbing layer 550 can represent high scratch resistance. In addition, the upper impact absorbing layer 550 may include acryl resin or urethane resin.

In order to form the upper impact absorbing layer 550, acryl resin composition and/or urethane resin composition are coated on the bottom surface of the upper substrate 520. Thereafter, the coated resin composition is cured by UV light and/or heat, so that the upper impact absorbing layer 550 can be formed.

The lower impact absorbing layer 540 is coated on the bottom surface of the lower substrate 510. In addition, the upper impact absorbing layer 550 is coated on the top surface of the upper substrate 520. Therefore, the lower impact absorbing layer 540 can improve the sealing property of the lower substrate 510. In addition, the upper impact absorbing layer 550 can improve the sealing property of the upper substrate 520.

Therefore, the lower impact absorbing layer 540 and the upper impact absorbing layer 550 can easily prevent the wavelength conversion particles 531 contained in the wavelength conversion layer 530 from being deformed due to external moisture and/or external oxygen.

In addition, the lower impact absorbing layer 540 may have a refractive index lower than that of the lower substrate 510. In addition, the upper impact absorbing layer 550 may have a refractive index lower than that of the upper substrate 520.

Therefore, the lower and upper impact absorbing layers 540 and 550 improve the incidence of external light, and can act as an anti-reflective layer to prevent the light from being reflected to the outside.

As shown in FIG. 4, the lower impact absorbing layer 540 may be directly provided on the bottom surface of the wavelength conversion layer 530. In other words, the lower impact absorbing layer 540 may be directly coated on the bottom surface of the wavelength conversion layer 530.

The upper impact absorbing layer 550 may be directly provided on the top surface of the wavelength conversion layer 530. In other words, the upper impact absorbing layer 550 may be directly coated on the top surface of the wavelength conversion layer 530.

In addition, as shown in FIG. 5, a lower anti-reflective layer 560 may be formed on the bottom surface of the lower substrate 510. In addition, the lower impact absorbing layer 540 may be directly coated on the bottom surface of the lower anti-reflective layer 560.

An upper anti-reflective layer 570 may be formed on the top surface of the substrate 520. The upper impact absorbing layer 550 may be directly coated on the top surface of the upper anti-reflective layer 570.

The lower and upper anti-reflective layers 560 and 570 can serve as an anti-reflective function. The lower anti-reflective layer 560 may have a refractive index lower than that of the lower substrate 510, and the upper anti-reflective layer 570 may have a refractive index lower than that of the upper substrate 520.

The refractive index of the lower impact absorbing layer 540 may be lower than that of the lower anti-reflective layer 560. The refractive index of the upper impact absorbing layer 550 may be lower than that of the upper anti-reflective layer 570.

Therefore, the light can be effectively incident onto the wavelength conversion layer 530 by the lower and upper impact absorbing layers 540 and 550 as well as the lower and upper anti-reflective layers 560 and 570.

The liquid crystal panel 20 is disposed on the optical sheets 500. In addition, the liquid crystal panel 20 is disposed on the panel guide 23. The liquid crystal panel 20 is guided by the panel guide 23.

The liquid crystal panel 20 displays images by adjusting intensity of light passing through the liquid crystal panel 20. In detail, the liquid crystal panel 20 is a display panel for displaying the images by using the light emitted from the backlight unit 10. The liquid crystal panel 20 includes a TFT substrate 21, a color filter substrate 22 and a liquid crystal layer interposed between the two substrates. In addition, the liquid crystal panel 20 includes polarizing filters.

Hereinafter, the TFT substrate 21 and the color filter substrate 22 will be described in detail although it is not shown in the drawings in detail. The TFT substrate 21 includes a plurality of gate lines and a plurality of data lines crossing the gate lines to form pixels and a thin film transistor (TFT) is provided at each cross section such that the thin film transistor TFT can be connected to a pixel electrode of the pixel in one-to-one correspondence. The color filter substrate 22 includes color filters having R, G and B colors corresponding to the pixels, a black matrix covering the gate lines, data lines and thin film transistors within the limit of the color filters, and a common electrode covering the above elements.

A driving PCB 25 is provided at an outer peripheral portion of the LCD panel 21 to supply driving signals to the gate lines and data lines.

The driving PCB 25 is electrically connected to the liquid crystal panel 20 by a COF (chip on film) 24. The COF 24 may be replaced with a TCP (tape carrier package).

The wavelength conversion sheet 504 may be provided on the uppermost portion of the optical sheets 500. In other words, the wavelength conversion sheet 504 can cover other optical sheets 500. Therefore, the wavelength conversion sheet 504 can protect other optical sheets 500.

In detail, the bottom cover 100 receives therein the light guide plate 200, the reflective sheet 300, the light emitting diodes 400, the printed circuit board 401, and the optical sheets 500 without the wavelength conversion sheet 504. Thereafter, the wavelength conversion sheet 504 is stacked on the optical sheets 500, so that the assembly of the backlight unit 10 is completed.

Thereafter, when the liquid crystal panel is assembled, the backlight unit 10 may be transferred. In this case, since the wavelength conversion sheet 504 includes the upper impact absorbing layer 550, the wavelength conversion sheet 504 can protect other optical sheets 501, 502, and 503 while minimizing the damage of the wavelength conversion sheet 504.

In addition, as shown in FIG. 6, the second prism sheet 503 is provided on the top surface thereof with a plurality of protrusion patterns 580 having a pyramid shape. The protrusion pattern 580 may directly make contact with the bottom surface of the wavelength conversion sheet 504.

Thereafter, since the wavelength conversion sheet 504 includes the lower impact absorbing layer 540, the wavelength conversion sheet 504 can minimize the damage caused by the protrusion pattern 580. Therefore, the liquid crystal display according to the embodiment can minimize damages caused by external and internal physical impacts. Therefore, the liquid crystal display according to the embodiment can minimize the degradation of image quality caused by scratches.

In addition, the wavelength conversion sheet 504 includes anti-reflection layers at both upper and lower portions thereof. Therefore, as shown in FIG. 7, the light passing through the wavelength conversion layer 530 without being changed can be reflected downward by the liquid crystal panel 20. In this case, the light reflected downward can be effectively incident onto the wavelength conversion layer 530 by the upper impact absorbing layer 550 and/or the upper anti-reflective layer 570.

As described above, since a greater amount of light is incident onto the wavelength conversion layer 530, the conversion efficiency of the wavelength conversion layer 530 can be more improved.

Therefore, the wavelength conversion sheet 504 effectively converts the wavelength of the light output from the light emitting diodes 400, and the liquid crystal display according to the embodiment can represent the improved color reproduction and brightness.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The LCD according to the embodiments can be used in the display field.

The invention claimed is:

1. An optical member comprising:
   a wavelength conversion layer to convert a wavelength of an incident light;
   a lower substrate and an upper substrate on the wavelength conversion layer;
   an impact absorbing layer on each of the lower substrate and the upper substrate; and
   an anti-reflective layer provided on the lower substrate and the upper substrate,
   wherein the impact absorbing layer is coated on the anti-reflective layer.

2. The optical member of claim 1, wherein an elastic modulus of the impact absorbing layer is in a range of about $5.8N/cm^2$ to about $6.6N/cm^2$.

3. The optical member of claim 1, wherein the impact absorbing layer includes a material selected from the group consisting of acrylic resin and urethane resin.

4. A display device comprising:
   a light source;
   a plurality of first optical sheets onto which a light emitted from the light source is incident;
   a second optical sheet on the first optical sheet; and
   a display panel provided on the second optical sheet,
   wherein the second optical sheet comprises:
      a wavelength conversion layer to convert a wavelength of the light emitted from the light source; and
      a first impact absorbing layer on the wavelength conversion layer.

5. The display device of claim 4, wherein the second optical sheet directly faces the display panel.

6. The display device of claim 4, wherein the second optical sheet comprises a second impact absorbing layer below the wavelength conversion layer, and the second impact absorbing layer directly makes contact with the first optical sheet.

7. The display device of claim 6, wherein the first optical sheet comprises a protrusion pattern protruding toward the display panel, and the protrusion pattern directly makes contact with the second impact absorbing layer.

8. The display device of claim 4, wherein the first impact absorbing layer includes a material selected from the group consisting of acrylic resin and urethane resin.

9. The display device of claim 4, further comprising a third optical sheet interposed between the first optical sheet and the display panel, wherein the third optical sheet is a prism sheet, and the second optical sheet is a diffusion sheet.

10. The display device of claim 4, further comprising a third optical sheet interposed between the first optical sheet and the display panel, wherein the second and third optical sheets are prism sheets.

11. A display device comprising:
    a light source;
    a wavelength conversion member to convert a wavelength of light emitted from the light source; and
    a display panel on the wavelength conversion member,
    wherein the wavelength conversion member comprises:
       a wavelength conversion layer including a plurality of wavelength conversion particles;
       a lower substrate and an upper substrate on the wavelength conversion layer; and
       an impact absorbing layer on each of the lower substrate and the upper substrate.

12. The display device of claim 11, wherein the impact absorbing layer is directly provided on the lower substrate and the upper substrate.

13. The display device of claim 12, wherein a refractive index of the impact absorbing layer is lower than a refractive index of the lower substrate and the upper substrate.

14. The display device of claim 11, wherein the wavelength conversion member further comprises:
    an anti-reflective layer provided on the lower substrate and the upper substrate,
    wherein the impact absorbing layer is directly provided on the anti-reflective layer.

15. The display device of claim 14, wherein the anti-reflective layer has a refractive index lower than a refractive index of the lower substrate and the upper substrate, and the impact absorbing layer has a refractive index lower than a refractive index of the anti-reflective layer.

16. The display device of claim 15, wherein the impact absorbing layer includes a material selected from the group consisting of acrylic resin and urethane resin.

* * * * *